United States Patent [19]

Kim et al.

[11] Patent Number: 4,842,391
[45] Date of Patent: Jun. 27, 1989

[54] TWO SPHERICAL LENS OPTICAL COUPLER

[75] Inventors: Ernest M. Kim; Jack Peter, both of San Diego, Calif.

[73] Assignee: Tacan Corporation, Carlsbad, Calif.

[21] Appl. No.: 152,958

[22] Filed: Feb. 5, 1988

[51] Int. Cl.⁴ .............................................. G02B 6/32
[52] U.S. Cl. .............................. 350/96.18; 350/96.20
[58] Field of Search ............. 350/96.15, 96.17, 96.20, 350/96.18; 250/227, 552; 357/17, 19, 30, 74, 80

[56] References Cited

U.S. PATENT DOCUMENTS

| | | | |
|---|---|---|---|
| 3,620,603 | 11/1971 | White et al. | 350/96.18 |
| 4,265,511 | 5/1981 | Nicia et al. | 350/96.18 |
| 4,304,461 | 12/1981 | Stewart et al. | 350/96.18 |
| 4,371,233 | 2/1983 | Masuda | 350/96.18 |
| 4,451,115 | 5/1984 | Nicia et al. | 350/96.18 |
| 4,468,087 | 8/1984 | Milan et al. | 350/96.18 |
| 4,475,788 | 10/1984 | Tomassini et al. | 350/96.18 X |
| 4,592,619 | 6/1986 | Weidel | 350/96.11 |
| 4,632,505 | 12/1986 | Allsworth | 350/96.18 X |
| 4,705,351 | 11/1987 | Toda | 350/96.18 |
| 4,749,250 | 6/1988 | Carter | 350/96.15 X |

OTHER PUBLICATIONS

Kawano et al., "New Calculations For Coupling Laser Diode to Multimode Fiber," Journal of Lightware Tech. (Mar. 1986, pp. 368–374).
Kawano et al., "Coupling Characteristics of Laser Diode to Multimode Fiber Using Separate Lens Methods," Applied Optics (Jan. 1986, pp. 136–141).
Holzman, "Design Considerations for Lenses Used for Coupling Single- and Multi-mode Fibers," SPIE vol. 500 (1984, pp. 56–66).

Primary Examiner—John D. Lee
Assistant Examiner—Phan T. Heartney
Attorney, Agent, or Firm—Baker, Maxham, Jester & Meador

[57] ABSTRACT

An optical coupling apparatus employing two spherical lenses between the optical signal source and the target. Each lens is positioned at its respective focal length from its associated optical element and is adjustable along a single axis. The lens adjustment axes are mutually perpendicular and both are perpendicular to the optical axis between the source and the target. The source may be a laser diode and the target is typically an optical fiber. This structure permits less than precise coaxial alignment between the source and target while maintaining desired optical coupling efficiency.

25 Claims, 1 Drawing Sheet

TWO SPHERICAL LENS OPTICAL COUPLER

FIELD OF THE INVENTION

This invention relates generally to optical couplers and more particularly to a device for coupling a light source into an optical fiber.

BACKGROUND OF THE INVENTION

Since the advent of optical fibers significant efforts have been underway to devise means for efficiently coupling optical signals onto a target at an economical cost. Current methods use expensive, exotic optics or difficult pigtailing techniques to couple light from a source such as a laser diode to a target such as an optical fiber or a photodetector. Such complex mechanisms, having severe tolerance requirements, are disclosed in a number of issued patents. The pigtailing techniques particularly apply to packaged laser diodes where the optical fiber is connected through an opening in the package directly to, or as close as possible to being directly to, the laser diode itself.

In order to couple light from sources such as a packaged laser diode to a target such as an optical fiber with minimal signal loss, adjustments of the positions of the components are required in all three axes. These adjustments normally require very high precision. In order to permit these adjustments, the components usually are "floating" which allows for the necessary adjustments. After determining the optimum position of the lenses used to couple light from the source to the target, the components are typically all fixed in place with respect to each other and with respect to the housing involved.

One concept that has been put forth for light coupling of this type is to use balls or spherical lenses to couple light from a source to a target. This concept has been explored in several publications and patents. Theoretical and experimental studies in the so-called "expanded beam" method have shown the deleterious effects of misalignments of the ball lenses to the optical axis. The prior art solution for compensating for the undesired offsets, which leads to loss of coupled optical signal power, lies in highly precise manufacturing tolerances.

U.S. Pat. Nos. 4,265,511 and 4,451,115, both issued to Nicia et al, disclose the use of two ball lenses for coupling optical fibers. These patents disclose the concept of carefully aligning each fiber in a tube at a precise axial and distance position with respect to its respective ball lens. The couplers of these patents only have adjustments to the axis angle of the aligned fibers in order to insure both axes are parallel. There is no provision for lateral adjustment of either ball lens with respect to its fiber. These patents indicate that even with offset but parallel fiber axes, the ball lenses will couple a significant portion of the optical signal, whereas without the ball lenses there would be substantially no coupling between the two fibers with the same offset.

Certain other patents show two ball lens coupling systems for connecting optical fibers but they do not disclose any adjustment means of the balls with respect to the fibers. These assemblies depend on manufacturing tolerances and unique methods for optimum alignment of optical fibers. These U.S. Pat. Nos. include 4,304,461, 4,371,233, 4,468,087, 4,592,619 and 4,632,505. U.S. Pat. No. 3,620,603 discloses a single ball lens system where the lens is movable, in a plane perpendicular to the optical axis. The optical source is coupled to a spherical target surface or other spherical optical collection device through the adjustable ball lens. The use of a standard cup point set screw and tension spring which acts on the side of the ball opposite to the set screw provides the physical means for adjustment. The purpose of this patent is to provide for tilting of the optical plane by relative movement between the lens and the spherical target surface, which target surface may be a bundle of optical fiber ends. The patent also suggests that the ball lens may be comprised of several elements. The purpose is to focus different objects at different distances from the ball lens at the same time, always on the same spherical target surface. There is, however, no suggestion to employ two ball lenses for this purpose. More specifically, a second ball lens would have no function in this prior art invention.

SUMMARY OF THE INVENTION

Broadly speaking, this invention comprises an optical coupling system for coupling light into an optical fiber employing a dual adjustable spherical lens system.

The optical system of the invention comprises a housing with means at either end to secure in fixed position the light signal source and the end of the optical fiber, normally a connectorized optical fiber. In the space between the optical signal source and the optical fiber is a pair of spherical lenses, each of which is adjustable in position perpendicular to the optical axis, the lenses being movable in a mutually orthogonal manner. The distance between the target lens and the target, or end of the optical fiber, is equal to the focal length of the target lens. Similarly, the distance between the source lens and the optical signal source is equal to the focal length of the source lens.

By using a housing of predetermined size and shape, and using a packaged laser diode together with a connectorized optical fiber, the positions of the source and target with respect to the housing and with respect to each other are fixed. The spherical lenses within the housing may be adjusted in a very fine and precise manner, such as by means of set screws functioning as a vernier. The set crews are threaded into tapped holes through the side of the housing and each lens may be adhesively mounted on the cup point end of the set screw within the housing.

Thus, the spherical lens is fixed to the set screw and rotates therewith while, the longitudinal position of a set screw, and thereby the position of the ball lens with respect to the optical axis, is moved. Alternatively, the ball may only rest on the cup point of the set screw and be opposed by a compression spring positioned at the opposite side of the ball between it and the inner wall of the housing. The position of the ball is adjusted in the same way with this alternative lens retaining structure but the ball is not fixed to the screw and does not necessarily rotate with it.

BRIEF DESCRIPTION OF THE DRAWING

The objects, advantages and features of this invention will be more readily perceived from the following detailed description, when read in conjunction with the accompanying drawing, in which.

DESCRIPTION OF THE PREFERRED EMBODIMENTS

Figure 1:
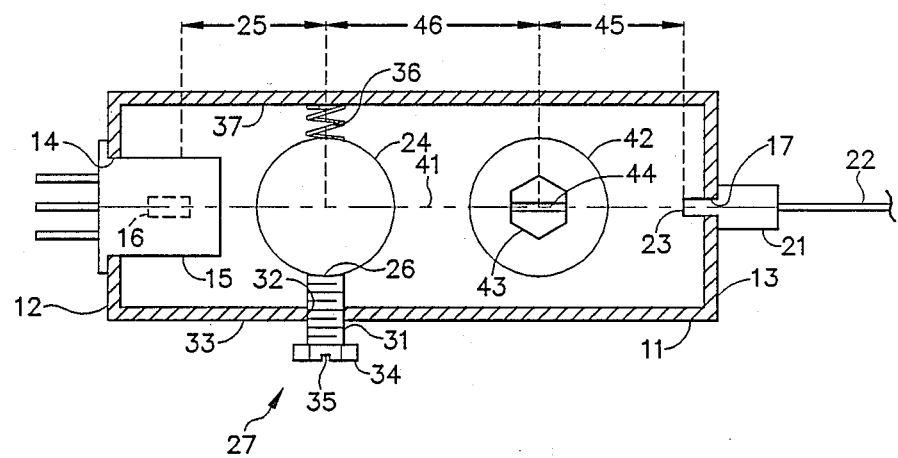
FIG. 1 is a schematic representation of the optical coupling system of this invention.

With reference now to the drawing, and more particularly to FIG. 1 thereof there is shown housing 11 having end faces 12 and 13. End face 12 is formed with opening 14 in which is mounted laser diode package 15 containing laser diode 16 therein. End face 1 of housing 11 is formed with opening 17 in which is mounted connector 21 of optical fiber 22. Optical fiber 22 is referred to as a connectorized optical fiber because the connector is typically assembled to the fiber before being mounted in a coupling device. The end of the optical fiber extends into the opening within housing 11 and has an end 23 coincident with the inner end face of connector 21. It is contemplated that housing 11 will be generally cylindrical but it could have any convenient shape. Source spherical lens 24 is shown mounted within housing 11 at the focal distance 25 from laser diode 16. Sphere 24 is mounted to cup end 26 of set screw 27 which has threads 31 engaged in threaded hole 32 in side wall 33 of housing 11. Screw 27 has a hexagonal head 34 and a slot 35 making it convenient for rotating the screw and thereby axially adjusting the position of lens 24 within housing 11. Lens 24 may be adhesively secured to cup end 26 of screw 27 or it may rest on the cup end and be maintained in place by means of compression spring 36 positioned between wall 37 of housing 11 and the side of lens 24 opposite cup end 26 of the set screw. Note that the direction of adjustment of spherical lens 24 is perpendicular to optical axis 41 between source 16 and end 23 of optical fiber 22. It is normally expected that both source and target are directional with respect to emitting and receiving light.

Target spherical lens 42 is mounted and adjusted in identical manner. Set screw 43 is shown with exposed slot 44 and also has a hexagonal shape. Spherical lens 42 is positioned at focal length 45 from end 23 of the optical fiber. The movement of lens 42, by means of set screw 43, is also perpendicular to optical axis 41 and to the direction of motion of lens 24.

If the lens is secured to the adjusting set screw, it will of course rotate with the screw as it is adjusted along an axis. It has been found that ball lenses of the size discussed can be made of sufficient accuracy that rotation does not cause deleterious effects on the optical signal coupling.

The two ball lenses are employed as shown in FIG. 1 to couple light from the source, such as laser diode 16, to a target, typically optical fiber 22, without the use of complex structures and exotic manufacturing procedures with high tolerance requirements. Other examples of optical signal sources include light emitting diodes (LED's) and other optical fibers. Whether a discrete device or a packaged element, the optical source has an optical signal emitting port. Similarly, the target may be thought of as having an optical signal receiving port. Another example of a target is a photodetector diode.

With further reference to FIG. 1, ball lens 24 is used to collimate the optical signal from source 16, and ball lens 42 focuses that collimated light onto target 23. As stated previously, both the source and the target are in fixed positions in housing 11. Coupling of maximum optical power from the source to the target is accomplished by selectively adjusting the positions of the ball lenses perpendicular to optical axis 41. In physics, the direct line from the source to the target, that is, the axis of travel of the optical wave, is called the Poynting vector. By adjusting the two spherical lenses in mutually perpendicular directions, perpendicular to the optical axis, the optical system of this invention eliminates the requirement for precise coaxial alignment of the source and the target. The separation 46 between the two spherical lenses is not critical due to the expanded beam characteristic. Therefore, adjustments in the direction of the optical axis are not required.

Figure 2:
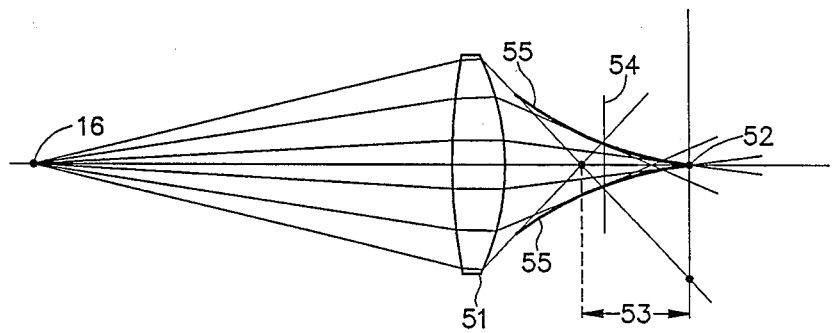
FIG. 2 is a schematic representation of the spherical aberration of a ball lens of the type employed in FIG. 1.

The placement of the spherical lenses, source and target is within easy manufacturing tolerance due to system depth-of-focus. If the components are chosen such that the system exhibits longitudinal spherical aberration and the target area is large enough, the aberration will increase the depth-of-focus-like effect. Thus a potential detriment, spherical aberration, is used to advantage by this invention. This is shown in the optical beam diagram of FIG. 2. Optical signal source 16 is positioned to the left of lens 51. Lens 51 represents a combination of spherical lenses 24 and 42 for purposes of this explanation. Point 52 is the paraxial focus which would be the ideal location for target 23, the end of the optical fiber. To indicate the depth-of.-focus, note that distance 53 represents the longitudinal spherical aberration (a depth-of-focus-like effect), within which is included the circle of least confusion marked by perpendicular plane 54. Curved lines 55 represent the caustic of the signal beam as it focuses from lens system 51.

The optical system of this invention may be used with both single and multi mode optical fibers. Examples of the size of the fibers used in this invention would include a core of 50–85 μm in a cladding with a total outside diameter of 125 μm. The single mode fiber would typically have a core of 8 μm inside a 125 μm outside diameter. Because the laser diode is within a package and thereby at some distance from the nearest point at which the source spherical lens may be mounted, the spherical lens diameter is relatively large, in the order of 5 mm. A large ball requires a relatively long focal length. It is contemplated that the refractive index of the spherical lenses used in this invention will be relatively low, in the order of 1.51. Thus, it can be seen for a given structure, the refractive index and ball size are determined by the physical arrangement. An example of the material which can be used for the spherical lens is simple or common glass sometimes referred to BK7. It is also possible to use doped silicon or sapphire.

While it is not necessary that both source and target spherical lenses be of the same size, in order to obtain optimum coupling the target spherical lens must be at least as large as the source lens. It is contemplated that both spherical lenses would be normally about the same size.

The focal length for lenses of the type used in this invention can be represented by the equation $$f = (nR)/2(n-1) \qquad Eq. 1$$

where n is the index of refraction and R is the radius of the spherical lens. For the parameters mentioned above, the focal length $f = 3.66$ mm or about 1.1 mm from the edge of spherical lens 42 to end 23 of the optical fiber. However, this focal length can be plus or minus 50 μm for best power coupling. It should be noted that the tolerance is even greater than that. It has been found that the half power points range between plus 350 μm to minus 70 μm. Thus the determination was made that setting the focal length within 50 μm of the theoretical optimum location provides best results but still with significant positional and assembly tolerances.

With the optical coupling system configured as shown and described, substantially the entire diameter of each lens is used to collimate and focus optical signals. While greater spherical aberrations will be encountered by employing the entire diameter of the ball lenses for optical signal coupling compared with some systems employing substantially less than the full spherical lens diameter, that spherical aberration is used to advantage by increasing the effective depth-of-focus at the target. This follows from the discussion of FIG. 2 above.

Testing for optical coupling efficiency entails energizing the optical source and measuring the power of the optical signal received by the target, and individually, selectively moving each spherical lens to achieve maximum received optical power. This configuration shows only a 4.7db loss when coupling optical signals into a 50 μm core fiber. This is the result of the combined optical system of this invention employing two spherical lenses. Studies by other researchers of a single ball system shows substantially the same 4.7db loss. Thus, this invention, employing two ball lenses in a simple structure which allow for relatively low manufacturing and assembly tolerances has no more loss than the highly precise single ball lens structures which have been studied. It has also been found that by having such precise incremental adjustments available by means of a screw thread or vernie, the lens system of this invention can accommodate an axial offset between source and target of at least ±25 μm. While the two ball system of this invention can handle an even greater offset, it is believed that the offset should be maintained within about 25 μm for best results. For the size of structural elements described herein, the offset can be as high as 100 μm for a multi mode fiber. The range of adjusting motion for the ball lenses may be ±250 μm.

One primary purpose of this invention is to provide simple cost effective manufacturing processes using relatively inexpensive components. It has been found that this invention accomplishes that purpose very well, providing as good results as have been achieved with much more expensive structures but at a small fraction of the cost. For example, pigtailing as described previously, requiring direct fiber connection into the laser diode package, is a very expensive process whereas manufacturing the equivalent structure of the present invention is inexpensive. The relative cost ratio is in the range of 25 to 1.

In the above description we have assumed a specific set of elements having particular sizes and size relationships. We considered optical fibers, both single and multi mode, as the target. This invention is much broader than that and can effectively couple any optical signal source with any optical target. The lens sizes and focal lengths would maintain similar relationships with the adjusting means and the source and target as described above, and Eq. 1 would apply. For best results the lens adjusting axes should be very close to orthogonal, although some variation could be tolerated, at least one or two degrees off perpendicular.

In view of the above description it is likely that modifications and improvements will occur to those skilled in the art which are within the scope of the accompanying claims.

What is claimed is:

1. Optical coupler apparatus comprising:
   a housing;
   a source of optical signals mounted to one side of said housing;
   an optical target mounted to the opposite side of said housing, there being an optical axis between said source and said target;
   a spherical source lens positioned adjacent said optical signal source at about the focal length of said source lens from said signal emitting port;
   a spherical target lens positioned adjacent said optical target at about the focal length of said target lens from said target;
   first means for adjusting the position of said source lens along only a first axis substantially perpendicular to said optical axis, said first adjusting means being connected between said source lens and said housing;
   second means for adjusting the position of said target lens along only a second axis substantially perpendicular to both said optical axis and said first axis, said second adjusting means being connected between said target lens and said housing.

2. The apparatus recited in claim 1, wherein said first and second lens adjusting means are engaged with said housing by threaded means, thereby providing a vernier type of axial adjustment to said source and target lenses.

3. The apparatus recited in claim 2, wherein said housing is a closed cylinder having openings in either end for said optical signal source and said target and having openings in the side wall to provide access to said first and second adjusting means.

4. The apparatus recited in claim 1, wherein said first adjusting means comprises a first set screw threadedly engaged with respect to said housing, said source lens being in contact with one end of said first set screw and moving along a first axis as said first set screw is rotated.

5. The apparatus recited in claim 4, wherein said first adjusting means further comprises a compression spring connected between said housing and a point on said source lens opposite said set screw.

6. The apparatus recited in claim 1, wherein said second adjusting means comprises a second set screw threadedly engaged with respect to said housing, said target lens being in contact with one end of said second set screw and moving along a second axis as said second set screw is rotated.

7. The apparatus recited in claim 6, wherein said second adjusting means further comprises a compression spring connected between said housing and a point on said target lens opposite said set screw.

8. The apparatus recited in claim 1, wherein said optical signal source is a packaged laser diode.

9. The apparatus recited in claim 1, wherein said target is a connectorized optical fiber.

10. The apparatus recited in claim 1, wherein said optical signal source and said target are fixed with respect to each other both on the optical axis and laterally with respect to the optical axis.

11. The apparatus recited in claim 1, wherein said source lens has a diameter of about 5 mm and is positioned within 50 μm of its focal length from said optical signal source.

12. The apparatus recited in claim 1, wherein said target lens has a diameter of about 5 mm and is positioned within 50 μm of its focal length from said target.

13. The apparatus recited in claim 1, wherein said optical signal source is a light emitting diode.

14. The apparatus recited in claim 1, wherein said optical signal source is an optical fiber.

15. The apparatus recited in claim 1, wherein said target is a photodetector diode.

16. The apparatus recited in claim 1, wherein the combined offset of said optical signal source and said target can be at least as much as about 25 μm.

17. The apparatus recited in claim 1, wherein said target is a single mode optical fiber.

18. The apparatus recited in claim 1, wherein said target is a multi-mode optical fiber.

19. The apparatus recited in claim 1, wherein sad source and target lenses are of similar diameter at about 5 mm.

20. The apparatus recited in claim 19, wherein the refractive index of said source and target lenses is 1.51.

21. The apparatus recited in claim 1, wherein the relationship between said source lens and said source, and said target lens and said target is defined by the equation $$f = (nR)/2(n-1)$$

where f is the focal length of each said lens, n is the index of refraction said lens and R is the radius of said lens.

22. The apparatus recited in claim 4, wherein said source lens is secured to said first set screw and rotates therewith.

23. The apparatus recited in claim 6, wherein said target lens is secured to said second set screw and rotates therewith.

24. The apparatus recited in claim 2, wherein said source lens and said target lens are respectively mounted to said first and second lens adjusting means for rotation therewith as axial adjustment is accomplished.

25. A method for coupling optical signals between an optical signal source and an optical target, said method comprising the steps of:
arranging the source and the target on opposite sides of a housing in fixed relationship, optical signals being transmitted from the source to the target along an optical axis;
locating a spherical source lens within the housing on the optical axis at about the focal length of the source lens from the source, the source lens being movable along a first axis perpendicular to the optical axis;
locating a spherical target lens within the housing on the optical axis at about the focal length of the target lens from the target, the target lens being movable along a second axis perpendicular to the optical axis and to the first axis;
observing the power of the optical signal received by the target from the source;
selectively adjusting the source and target lenses along their respective axes to achieve maximum power received by the target.

* * * * *